Figure 14:
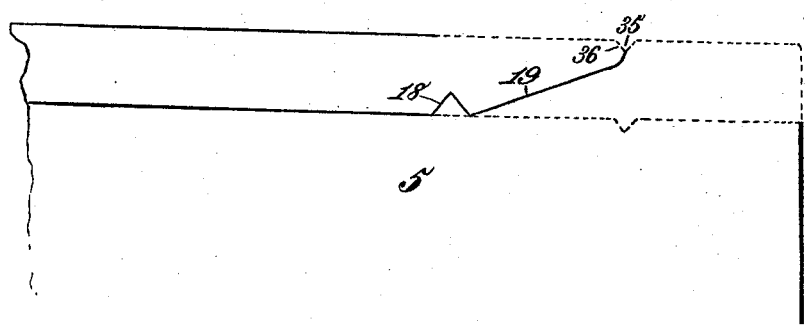

(No Model.) 4 Sheets—Sheet 1.
C. W. RICH.
MACHINE FOR CUTTING BARREL STAVES.
No. 485,565. Patented Nov. 1, 1892.
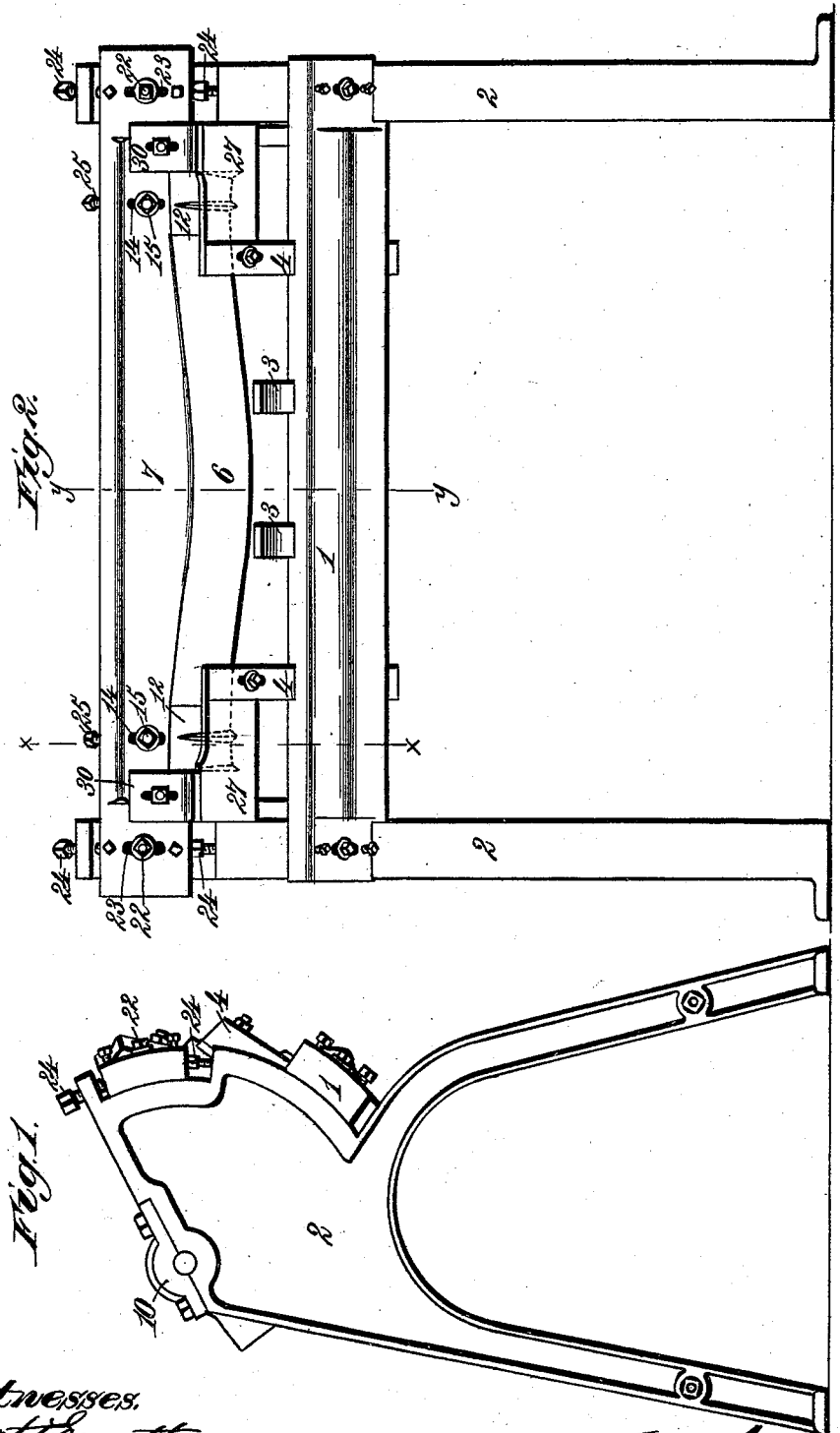

(No Model.) 4 Sheets—Sheet 2.
C. W. RICH.
MACHINE FOR CUTTING BARREL STAVES.
No. 485,565. Patented Nov. 1, 1892.
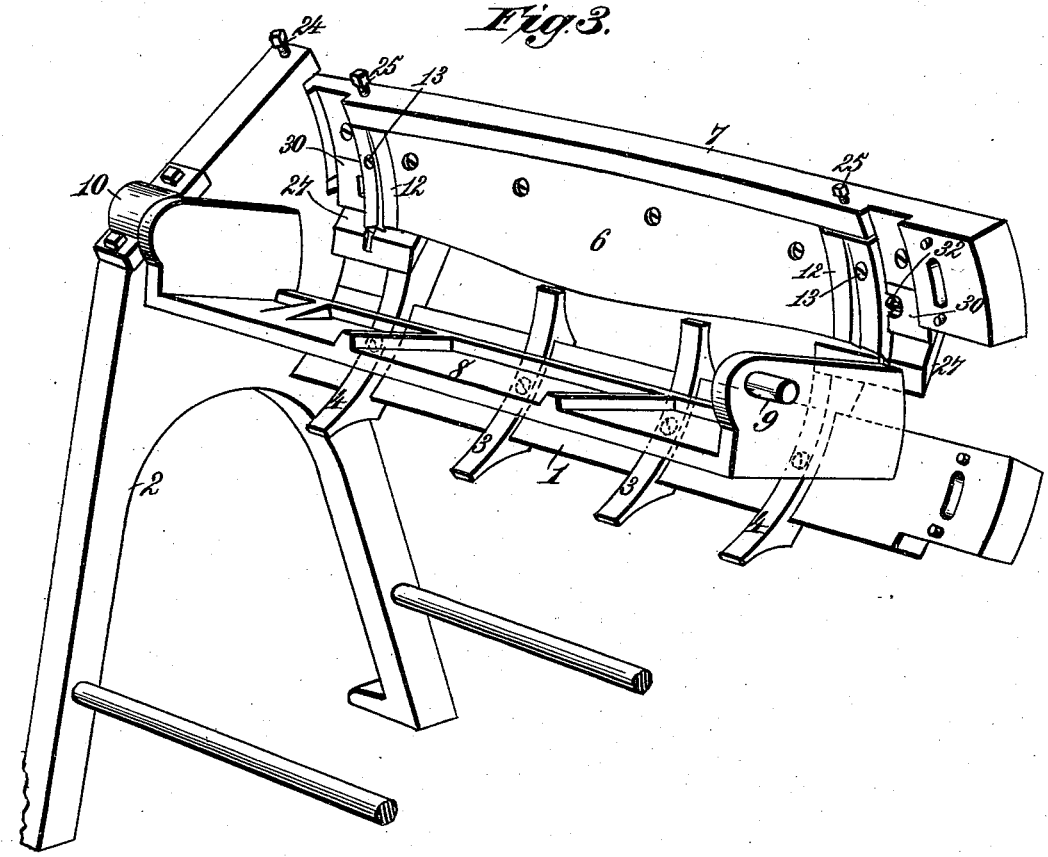
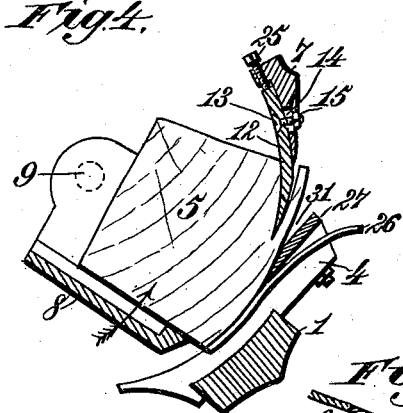
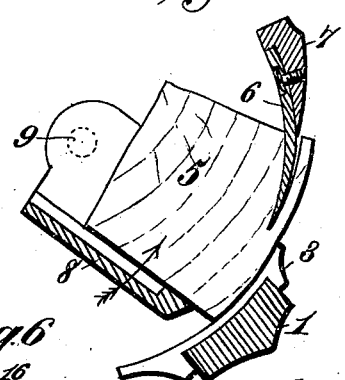
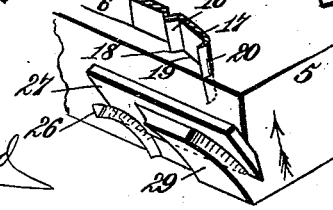
Witnesses.
Robert Orruitt.
J. A. Rutherford
Inventor.
Charles W. Rich.
By James L. Norris.
Atty (No Model.) 4 Sheets—Sheet 3.
C. W. RICH.
MACHINE FOR CUTTING BARREL STAVES.
No. 485,565. Patented Nov. 1, 1892.
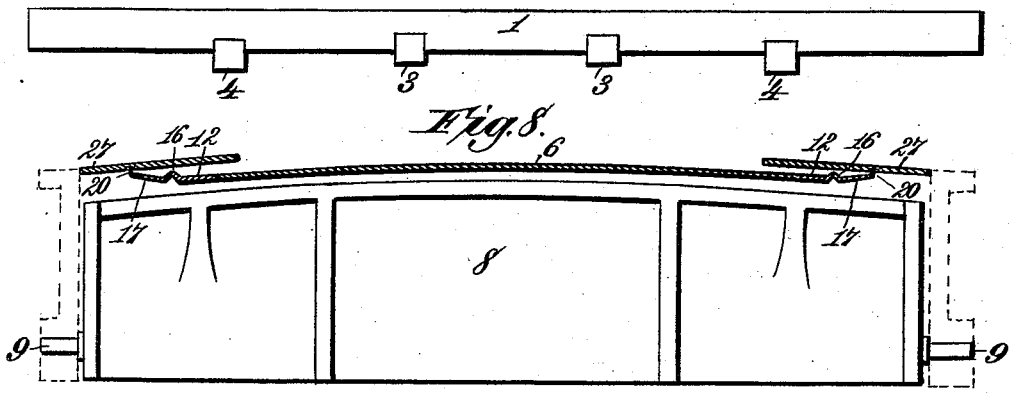
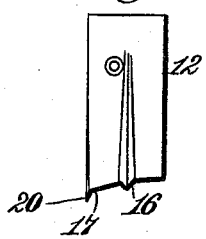 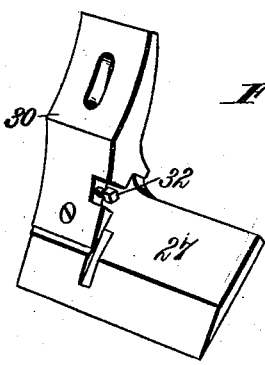
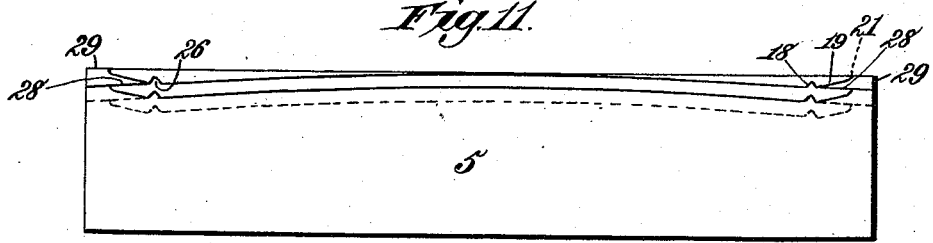
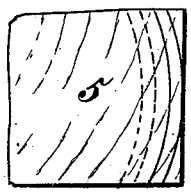
Witnesses.
Robert Cruitt
J. A. Rutherford
Inventor:
Charles W. Rich,
By James L. Norris
Atty.

(No Model.) 4 Sheets—Sheet 4.
C. W. RICH.
MACHINE FOR CUTTING BARREL STAVES.

No. 485,565. Patented Nov. 1, 1892.

Witnesses: Inventor:
Charles W. Rich.
By James L. Norris.
Atty.

UNITED STATES PATENT OFFICE.

CHARLES WILLIS RICH, OF SUMMERTOWN, ASSIGNOR TO HIMSELF, AND LUTHER L. FRIERSON, OF MOUNT PLEASANT, TENNESSEE.

MACHINE FOR CUTTING BARREL-STAVES.

SPECIFICATION forming part of Letters Patent No. 485,565, dated November 1, 1892.

Application filed June 30, 1891. Serial No. 398,055. (No model.)

*To all whom it may concern:*

Be it known that I, CHARLES WILLIS RICH, a citizen of the United States, residing at Summertown, in the county of Lawrence and State of Tennessee, have invented new and useful Improvements in Machines for Cutting Barrel-Staves, of which the following is a specification.

This invention relates to that type of machines for manufacturing staves for barrels and casks wherein a stave bolt or block is subjected to the action of cutters for severing the staves from the stave bolt or block and simultaneously therewith crozing and chamfering the staves.

In producing crozed staves at one cut from a stave bolt or block the formation of the croze leaves a residual rib on the back of the stave bolt or block, and if these ribs are not removed at the time of cutting the stave a pair of such ribs will project from one face or side of each stave.

The objects of my invention are to improve the prior construction of stave-cutting machines; to provide a machine which will remove the residual ribs from the face of a stave being severed from the stave-bolt; to reduce the expense of manufacture and facilitate the production of properly-shaped staves; to avoid the employment of independent machinery for crozing, chamfering, and bending the stave-blanks after they have been severed from the stave bolt or block; to provide a novel, simple, efficient, and economical machine for producing at one cut a crozed and chamfered stave properly hollowed and curved lengthwise to form the bilge in the barrel or cask, whereby it is possible to avoid the subsequent bending and holding of the staves by truss-hoops; to provide a knife which will chamfer, croze, and equalize the stave as the latter is being severed from the stave-bolt; to provide novel means for removing the residual rib from the face of a stave being severed from the stave-bolt, and at the same time bevel the end edges of such stave, and finally to produce at one cut a completely-shaped barrel-stave, which only requires to be trimmed at its edges for its immediate use in constructing a barrel or cask.

To accomplish all these objects my invention involves the features of construction and the combination or arrangement of devices hereinafter described and claimed, reference being made to the accompanying drawings, in which—

Figure 13:
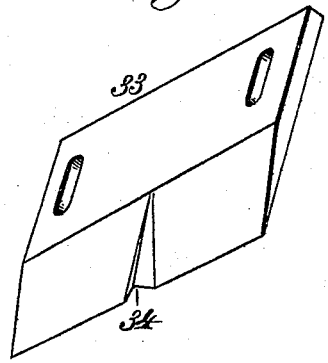

Figure 1 is an end elevation of my improved stave-cutting machine. Fig. 2 is a rear elevation of the same. Fig. 3 is a broken perspective view, omitting one of the end standards or frames. Fig. 4 is a detail vertical sectional view taken on the line $xx$, Fig. 2. Fig. 5 is a similar view taken on the line $y\ y$, Fig. 2. Fig. 6 is a detail broken perspective view showing the residual-rib-removing knife and one of the crozing and chamfering cutters. Fig. 7 is a detail plan view of the guide-bar and its guides. Fig. 8 is a detail plan view showing the oscillating table and the stave cutting, crozing, and chamfering knives. Fig. 9 is a detail view of one of the crozing and chamfering cutters. Fig. 10 is a detail perspective view of the residual rib-removing cutter and its supporting-bracket, showing, also, the adjusting-screw for forcing the crozing and chamfering cutter against one end of the stave-cutting knife. Fig. 11 is a plan view of a stave bolt or block, illustrating the manner of cutting the staves. Fig. 12 is a transverse sectional view of the same, showing the manner in which the staves are hollowed out or curved transversely. Fig. 13 is a detail perspective view showing a modified construction of the residual rib-removing knife or plane, and Fig. 14 is a detail view showing the cut made by the knife or plane represented by Fig. 13.

In order to enable those skilled in the art to make and use my invention, I will now describe the same in detail, referring to the drawings, wherein—

The numeral 1 indicates a horizontal guide-supporting bar secured at each extremity to an upright standard or frame 2 and provided at intervals along its length with intermediate segmental guides 3 and near each end with a similar segmental guide 4. These segmental guides are secured to the guide-supporting bar in any suitable manner and serve to support the stave-block 5 and guide it to the stationary stave-cutting knife 6, which is suitably secured to the horizontal knife-supporting bar 7, having its extremities rigidly secured to the standards or frames 2.

The stave bolt or block 5 is carried by an oscillatory table 8, having journals 9, mounted in boxes 10 on the standards or frames. The stave-bolt-carrying table is oscillated in the arc of a circle through the medium of a suitable pitman connection in the manner ordinarily practiced in this character of stave-cutting machines.

The stave-cutting knife 6 is curved longitudinally, as illustrated by Fig. 8, and is also curved transversely, as illustrated by Figs. 4 and 5. The longitudinal curve of the knife is for the purpose of severing a stave which will be curved lengthwise in approximately the form required to produce the usual bilge in the barrel or cask, while the transverse curve of the knife is for the purpose of hollowing out the stave and forming the transverse curve therein to produce the required barrel shape when the staves are assembled in the usual manner.

The stave-cutting knife 6 is provided at each extremity with a crozing and chamfering knife 12, which, as here exhibited, is made as a separate piece from the cutting-knife 6 and is vertically adjustable by any suitable device—such, for example, as an attaching-bolt 13, passing through the cutter and through a vertical slot 14 in the knife-bar 7, the rear end of the bolt having a nut 15 by which to clamp the cutter to its seat after its adjustment.

The crozing and chamfering cutters are made vertically adjustable because they wear more rapidly than the stave-cutting knife 6, and consequently it is desirable to adjust the crozing and chamfering cutters for the purpose of maintaining their cutting-edges in proper relation to the cutting-edge of the stave-cutting knife 6. The crozing and chamfering cutters are provided with angularly-shaped cutting portions 16 and oblique cutting portions 17, Fig. 6, for producing the croze 18 and chamfer 19, as in Fig. 11, while the extremity of the oblique cutting portion 17 is turned laterally, as at 20, to sever the stave to the proper length, as at 21, Fig. 11.

The knife-bar 7 is vertically adjustable by suitable means—such as set-screws 22, Fig. 2, passing through slots 23 in the knife-bar and engaging the frames or standards 2, or by upper and lower set-bolts 24, which are so arranged that the knife-bar can be raised or lowered and held rigidly in its adjusted position. To brace the crozing and chamfering cutters 12 against upward movement when acting upon the stave-bolt, I provide the knife-bar 7 with set-bolts 25 to bear against the upper edge of the crozing and chamfering cutters, as in Figs. 2 and 4.

In practice the stave bolt or block is placed upon the oscillatory table 8, and as the table rises the stave bolt or block is presented to the cutting-knives, which operate to sever the stave and simultaneously therewith croze and chamfer the same, as will be understood by reference to Fig. 11. The angular portion 16 of the crozing and chamfering cutters serve to croze the stave, and obviously the formation of the croze on the inside of the stave leaves on the stave bolt or block near each end thereof a residual rib 26, Fig. 11, which if not removed would project from the outer surface of the succeeding stave. To remove these residual ribs simultaneously with the cutting of the stave and the crozing and chamfering thereof, I provide suitable rib-removing knives or planes 27, which are preferably constructed to shave and smooth the outer surface of the staves at the points 28, Fig. 11, and also cut off the projecting portions 29, which are left on the stave bolt or block after a stave has been severed therefrom. In the example here illustrated the residual rib-removing knives or planes 27 are supported by brackets 30, secured to and vertically adjustable on the knife-bar 7, Fig. 2. The rib-removing knives or planes are attached to or formed with the brackets and project horizontally toward each other, so that their extremities can be, if desired, adjustably bolted to the upper end portions of the outermost segmental guides 4 in such manner that the rib-removing knives or planes can be adjusted vertically to suit the conditions required.

The cutting-edges of the rib-removing knives are arranged in advance of or below the cutting-edges of the crozing and chamfering cutters 12, as will be understood by reference to Fig. 4, and as the stave is being severed it extends between the stave-cutting knife and the rib-removing knives or planes, so that the residual ribs are removed from the face of the stave, being severed from the stave-bolt by the stave-cutting knife. The rib-removing knives or planes 27 are preferably beveled at the cutting-edge on the surface, which is presented to the stave-block, and these knives are set at such an angle or are so shaped that they recede from the crozing and chamfering knives from the top portion of the bevel in an upward direction to provide a proper space 31 for the exit of the stave, and thereby prevent it from becoming wedged between the rib-removing knives and the crozing and chamfering cutters.

It will be obvious that as a stave bolt or block is elevated by the rising movement of the table 8 the stave-cutting knife 6 and the crozing and chamfering cutters 12 penetrate the stave-bolt or block to form the stave, and the rib-removing knives or planes 27, being in advance of the cutting-edges of the knife 6 and cutters 12, operate to cut or plane off the residual rib 26, as in Fig. 4, thereby providing a smooth outer surface to the stave. At the same time the rib-removing knives or planes 27 act to cut off the surplus wood 29, Figs. 6 and 11, and smooth or plane the outside end portions 28, Fig. 11, of the stave.

By the means described I am enabled to employ an oscillating table for carrying the stave bolt or block in combination with a stationary stave-cutting knife 6, having at each extremity a crozing and chamfering cutter 12 for the purpose of producing staves which are crozed, chamfered, and equalized as regards the length, so that they are complete in all respects except, perhaps, as regards trimming their longitudinal edges.

The inner edge of the oscillatory table 8 is curved longitudinally in a manner similar to the longitudinal curve in the stave-cutting knife 6, and consequently I not only sever the stave from the stave-bolt and croze and chamfer the stave, but also impart to the stave the required longitudinal curve or bend to fulfill the conditions required in producing a barrel or cask with the usual bilge.

By the peculiar construction of the stave-cutting knife 6 the staves are hollowed out and curved lengthwise, so that it is possible to avoid subsequent bending and holding of the staves by truss-hoops.

I have exhibited the crozing and chamfering cutters as composed of sections independent of the stave-cutting knife 6; but I do not confine myself to this specific construction, for obviously the stave-cutting knife and the crozing and chamfering cutters could be composed of one continuous piece of steel.

If I employ the construction exhibited in the drawings, where the stave-cutting knife 6 and the crozing and chamfering cutters 12 are made as separate sections, it is advisable to employ the set-bolts 32 for the purpose of forcing the crozing and chamfering cutters closely against the extremities of the stave-cutting knife 6.

I have exhibited the residual rib-removing knives or planes 27 as on brackets attached to the knife-bar 7; but they may be otherwise connected with and supported by the knife-bar which carries the stave cutting, crozing, chamfering, and equalizing cutters or otherwise supported in such relation or juxtaposition to the stave cutting, chamfering, and equalizing cutters that the residual ribs 26 are removed from the face of the stave being severed from the stave-bolt, in which respects my improved machine is more simple and economical than that type of machine where veneering for barrels is sliced from a rotating log and crozed and chamfered by knives on a sliding carriage arranged at one side of the log, while knives on a sliding carriage at the opposite side of the log serve to remove direct from the log itself those ridges or ribs which are left by the crozing and chamfering knives.

In the drawings I have exhibited the angular portions 16 of the crozing and chamfering cutters approximately V-shaped to cut the V-shaped croze or kerf in the stave; but obviously these angular portions 16 will be shaped to correspond with the formation of croze or kerf which it is desired to produce in the staves.

The staves can be equalized in length by the cutters 12 or partly by such cutters and partly by knives or planes—such as shown at 33, Fig. 13—in the manner indicated by Fig. 14, where the part severed by the knife 6 and cutter 12 is represented by full lines and the part severed by the knife or plane 33 is represented by dotted lines. In this method of cutting the knife or plane 33 is provided with an approximately-V-shaped or other angular cutting portion 34 to produce the angular incision 35, Fig. 14, the remaining portion of the wood being severed by a cutter 12 to croze and equalize the staves. This produces a stave with smooth beveled ends, as at 36, to facilitate the application of the end hoops to the barrel.

The shape of the cutting portion 34 can be varied to form a rounded end 36, if such be desired.

It is preferable to so form the cutters 12 that they will cut off the staves and thereby equalize them in length; but I do not confine myself to this construction. It is also very desirable to form the stave-severing knife 6 curved lengthwise; but this is not indispensable, and I do not confine myself in this respect.

An important feature of my invention resides in the fact that the end portions of the stave-cutting knife are continuations of the stave-cutting edge of the main body of the knife, so that the cutting portions act to simultaneously chamfer, croze, and equalize the stave at one stroke. In other words, the chamfering and equalizing cutting portions of the knife are coincident with and continuations of the main cutting-edge of the knife, and therefore the stave is chamfered, crozed, and equalized at the same instant that the body of the knife severs the body of the stave from the stave block or bolt.

Having thus described my invention, what I claim is—

1. The combination, with a knife-bar, a cutting-knife for severing a stave from a stave-bolt, and crozing-knives for crozing the staves, of residual rib-removing knives or planes connected with and supported by the knife-bar which carries the stave cutting and crozing knives and arranged in proximity to the latter to provide a space between the stave-cutting knife and the rib-removing knives or planes for the passage of the stave being severed, substantially as described.

2. The combination, with a table for supporting a stave-bolt, a knife-bar, a stave-cutting knife secured to the knife-bar, and crozing-knives for crozing the staves, of residual rib-removing knives or planes arranged in proximity to the crozing-knives to provide a space between the stave-cutting knife and the rib-removing knives or planes for the passage of the stave being severed, substantially as described.

3. The combination, with a table for supporting a stave-bolt, of a knife-bar and a stave-cutting knife secured to the knife-bar and having cutting end portions, constituting continuations of the main cutting-edge and fashioned to such shape that with a single cut of the stave-knife there is severed from the stave-bolt a stave which is chamfered, crozed, and equalized, substantially as described.

4. The combination, with a table for supporting a stave-bolt, of a knife-bar, a stave-cutting knife secured to the knife-bar and having cutting end portions constituting continuations of the main cutting-edge and fashioned to such shape that with a single cut of the stave-knife there is severed from the stave-bolt a stave which is chamfered, crozed, and equalized, and knives or planes arranged in rear of the stave-cutting knife and which as the stave is being cut remove the residual ribs left on the stave-bolt by the formation of the croze in the preceding stave, substantially as described.

5. The combination, with a table for supporting a stave-bolt, of a knife for severing a stave from the stave-bolt, crozing and chamfering cutters for crozing and chamfering the staves, and residual rib-removing knives or planes arranged in proximity to the crozing and chamfering cutters to provide a space between the stave-cutting knife and the rib-removing knives or planes for the passage of the stave being severed, substantially as described.

6. The combination, with an oscillating table for supporting a stave-bolt, of a stationary knife-bar and a stave-cutting knife secured to the knife-bar and having cutting end portions constituting continuations of the main cutting-edge and fashioned to such shape that with a single stroke there is severed from the stave-bolt a stave which is chamfered, crozed, and equalized, substantially as described.

7. In a stave-cutting machine, the combination of a stave-knife whose extreme cutting end edges constitute continuations of the main cutting-edge of the knife and are turned laterally to equalize the stave at the same stroke it is severed from the stave-bolt with rear cutting knives or planes which plane off the end elevations left on the stave-bolt and are arranged in such proximity to the stave-severing knife as to provide a space for the passage of the stave being severed, substantially as described.

8. In a stave-cutting machine, the combination, with a table which carries the stave-bolt, of a lengthwise and transversely curved stave-cutting knife having crozing and chamfering edges, which constitute continuations of the main cutting-edge, and provided with laterally-projecting end edges, which equalize the stave at the same stroke it is severed from the stave-bolt, substantially as described.

9. In a stave-cutting machine, the combination of a stave-cutting knife having its end portions fashioned with chamfering, crozing, and equalizing cutting-edges constituting continuations of the main cutting-edge of the knife to chamfer, croze, and equalize the stave at the same stroke it is severed from the stave-bolt, with cutting knives or planes, which plane off the ribs left by the formation of the croze and chamfer in the preceding stave, substantially as described.

10. The combination of a table for supporting a stave-bolt, a stave severing, chamfering, and crozing knife provided at each end with a lateral cutting-edge, and residual rib-removing knives located at the rear of the stave-severing knife and provided with angular portions co-operating with the lateral cutting-edges of the stave-severing knife to equalize the staves and bevel their end edges at the same stroke that the stave is severed from the stave-bolt, substantially as described.

11. The combination of a table for supporting a stave-bolt, a stave-severing knife provided at each end with a lateral cutting-edge, and a knife or plane arranged in rear of the stave-severing knife and provided with an angular portion which co-operates with the latteral cutting-edge of the stave-severing knife to equalize the stave and bevel its end edges at the same stroke that the stave is severed from the stave-bolt, substantially as described.

12. The combination, with an oscillating table for supporting a stave-bolt, of a vertically-adjustable knife-bar, a stave-severing knife secured to the knife-bar, a vertically-adjustable crozing, chamfering, and equalizing cutter arranged at each extremity of the stave-severing knife and having the cutting-edges constituting continuations of the main cutting-edge of the stave-severing knife, so that at each cut there is severed from the stave-bolt a stave which is chamfered, crozed, and equalized, substantially as described.

13. In a stave-cutting machine, the combination, with a table which carries the stave-block, of a stave-cutting knife the end portions and edges of which are fashioned to such shape that with a single stroke of the stave-knife there is severed from the stave-block a stave which is chamfered, equalized, and crozed, substantially as described.

14. A stave-machine provided with a stave-cutting knife having cutting end portions constituting continuations of the main cutting-edge and formed to chamfer, croze, and equalize the staves at the stroke which severs the stave-body from the stave bolt or block, substantially as described.

15. The combination, with an oscillatory table for supporting a stave-bolt, of a vertically-adjustable knife-bar, a knife secured to the adjustable knife-bar for severing a stave from the stave-bolt, a vertically-adjustable crozing and chamfering cutter at each extremity of the stave-severing knife, and a vertically-adjustable knife or plane arranged in rear of the stave-severing knife and which as the stave is being cut removes the residual rib left on the stave-bolt by the formation of the croze in the preceding stave, substantially as described.

In testimony whereof I have hereunto set my hand and affixed my seal in presence of two subscribing witnesses.

CHARLES WILLIS RICH. [L. S.]

Witnesses:
JOHN S. DIXON,
E. W. BOND.